UNITED STATES PATENT OFFICE 2,455,648

METHOD OF PRODUCING AN ALKALINE DETERGENT

Wallis R. Bennett, Midland, Mich., assignor to The Dow Chemical Company, Midland, Mich., a corporation of Delaware No Drawing. Application January 5, 1946, Serial No. 639,419

2 Claims. (Cl. 252—135)

This invention relates to an alkaline detergent composition and to a method of making it.

Most cleaning compositions used industrially in washing bottles and other glassware contain sodium hydroxide as the principal detergent. However, aqueous solutions of sodium hydroxide tend to become cloudy, especially with hard waters, and to leave scums on the glassware which persist even after rinsing. Moreover, such solutions, when used in washing objects made of soft glass, frequently exhibit the undesirable property of attacking the glassware. This effect is especially pronounced in washing milk and beverage bottles, which are subject to considerable abrasion during handling, and in which the abraded portions often become etched so seriously that the bottles lose their pleasing appearance and take on a frosted look.

In view of these factors, it is the principal object of the present invention to provide an improved detergent composition which, in water solution, has the high alkalinity and good detergency of sodium hydroxide, has little tendency to become cloudy or to form scum, is free-rinsing, and does not attack glassware to any appreciable degree. Another object is to provide such a composition which is free-flowing and stable in storage, and has no tendency toward segregation of its components. A further object is to provide a simple, effective method of preparing such a composition.

These objects are realized with the compositions of the present invention which consist essentially of mixtures of an alkali-metal hydroxide, an alkali-metal zincate, and an alkali-metal orthophosphate. In aqueous solutions of these compositions, the hydroxide is the principal detergent. The zincate inhibits chemical attack on glassware and also may function as a detergent, and the orthophosphate controls hardness-forming constituents in the water, minimizes scum, and renders the solution free-rinsing. These solutions exhibit pH values almost equal to those alkali hydroxides alone and are more than equal to them in cleansing power.

In these new compositions, the alkali-metal hydroxide, zincate, and phosphate are usually sodium compounds, for economic reasons. However, the corresponding potassium and other alkali-metal compounds are also operable, as are mixtures of sodium and potassium compounds. The alkali-metal orthophosphate is most conveniently the tri-alkali-metal orthophosphate, e. g. trisodium orthophosphate ($Na_3PO_4$), although the other orthophosphates, such as the di- and mono-alkali-metal salts, e. g. $Na_2HPO_4$ and $NaH_2PO_4$, may also be used, since they are converted to the tri-alkali-metal orthophosphate by action of the alkali-metal hydroxide as soon as the detergent composition is dissolved in water.

The relative proportions of the three components of the new detergents may be varied widely. However, it is desirable that the alkali-metal hydroxide be the major constituent of the composition, the zincate and phosphate being in only minor and roughly equal proportions. Preferred compositions contain at least 75 per cent by weight of sodium hydroxide and from about 2 to about 10 per cent each of sodium zincate and trisodium orthophosphate. Optimum results are obtained when the compositions comprise at least 80 per cent of sodium hydroxide and from about 4 to about 5 per cent by weight each of the sodium zincate and the trisodium phosphate. Only commercial grades of the three essential components need be employed, and small proportions of other detergent materials may be added if desired.

In use, the detergents of the invention are dissolved in water in approximately the same proportion as is sodium hydroxide alone, e. g. 0.5 to 5 per cent by weight, and the resulting solutions are employed in washing glassware in conventional manner.

The compositions of the invention may be made up by mechanically mixing the powdered ingredients. However, it is preferred to mix the components together in the liquid or dissolved state and then to convert the resulting intimate mixture to the form of substantially anhydrous flakes or granules. Such materials are free-flowing, remain stable during storage in closed containers, show no tendency to segregate into the components, and dissolve rapidly in water at the time of use.

A particularly satisfactory method of making the new compositions consists in forming a solution of alkali zincate and tri-alkali phosphate in aqueous alkali hydroxide, heating the resulting solution at an elevated temperature below the decomposition temperature of the alkali zincate to vaporize substantially all the water from the solution, and converting the resulting anhydrous mixture to solid form, preferably to flakes or granules.

The alkali zincate may be added as such to the aqueous alkali hydroxide or may be formed in solution by adding a zinciferous material reactive with the hydroxide to form alkali zincate;

zinc oxide is particularly convenient. The trialkali-metal orthophosphate may likewise be added as such or formed in solution by reaction of a water-soluble phosphate with the hydroxide; disodium orthophosphate is a preferred agent. The order of addition of these compounds is not critical, except when zinc oxide is used, although it is usually best to add the zinciferous material before boiling off the water and the phosphate just prior to solidifying the anhydrous mixture. With zinc oxide, this order of addition must be followed, since this oxide is not soluble in hot anhydrous alkali hydroxide.

In a preferred procedure, zinc oxide or sodium zincate is stirred into aqueous sodium hydroxide and the mixture is heated to a temperature over 700° F., but not exceeding about 830° F. to drive off water. Disodium orthophosphate is then stirred in, and the mixture is cooled slightly and fed to an internally-cooled rotary drum flaker. The relative proportions of the constituents are chosen such that the final composition contains at least 75 per cent by weight of the hydroxide and from 2 to 10 per cent each of the zincate and orthophosphate.

An alternative procedure is to boil the water off aqueous sodium hydroxide to form an anhydrous melt, then to stir in disodium phosphate and zinc hydroxide, at a temperature below 830° F., and finally to flake the mixture.

Example

To a charge of 666 parts by weight of an approximately 76 per cent commercial aqueous sodium hydroxide solution, 14.5 parts of zinc oxide was added with stirring. The mixture was then boiled until the temperature reached 770° F., after which 21.5 parts of disodium orthophosphate was stirred in. The resulting solution was cooled to about 720° F., stirred, and then flaked. The flake was found on analysis to contain about 89.6 per cent NaOH, 4.6 per cent $Na_2ZnO_2$, and 4.35 per cent $Na_3PO_4$, the balance being impurities, chiefly NaCl, $Na_2CO_3$, and traces of water. The flake dissolved readily in water to give a clear solution having a pH value, at 0.1 per cent concentration, of about 12.1.

What is claimed is:

1. The method of making a detergent composition which comprises adding a material selected from the class consisting of zinc oxide and sodium zincate to approximately 76 percent aqueous sodium hydroxide and heating the resulting solution at an elevated temperature over 700° F. but below 830° F. to vaporize substantially all the water therefrom, mixing disodium orthophosphate into the heated solution, and then converting the entire mixture to the solid state, the said ingredients being in such relative proportions that the final composition contains at least 75 per cent by weight of sodium hydroxide and from 2 to 10 per cent by weight each of sodium zincate and trisodium orthophosphate.

2. The method of making a detergent composition which comprises adding a material selected from the class consisting of zinc oxide and sodium zincate to approximatly 76 percent aqueous sodium hydroxide and heating the resulting solution to a temperature of about 770° F. to vaporize substantially all the water therefrom, mixing disodium orthophosphate into the heated solution, and then flaking the resulting mixture, the said ingredients being in such proportion that the final composition contains at least 80 percent by weight of sodium hydroxide and from about 4 to about 5 percent each of sodium zincate and trisodium orthophosphate.

WALLIS R. BENNETT.

REFERENCES CITED

The following references are of record in the file of this patent:

UNITED STATES PATENTS

| Number | Name | Date |
|---|---|---|
| 1,759,152 | Booth et al. | May 20, 1930 |
| 2,289,578 | Hull et al. | July 14, 1942 |
| 2,403,157 | Wegst et al. | July 2, 1946 |